United States Patent [19]

Ottestad

[11] 4,262,917

[45] Apr. 21, 1981

[54] TOOL HOLDER FOR IMPACT TOOL

[76] Inventor: Jack B. Ottestad, 1442 Muirlands Dr., La Jolla, Calif. 92037

[21] Appl. No.: 950,401

[22] Filed: Oct. 11, 1978

[51] Int. Cl.[3] .............................................. B23B 31/30

[52] U.S. Cl. ...................................... 279/4; 279/1 ME

[58] Field of Search .......................... 279/4, 3, 19, 1 E; 173/134; 408/240

[56] References Cited

U.S. PATENT DOCUMENTS

| | | | |
|---|---|---|---|
| 2,944,523 | 7/1960 | Werstein | 279/19 X |
| 3,608,650 | 9/1971 | Matsusaka | 173/134 X |
| 3,609,969 | 10/1971 | Gerber | 173/134 X |
| 3,989,260 | 11/1976 | Zonkov et al. | 279/4 |

FOREIGN PATENT DOCUMENTS

| | | | |
|---|---|---|---|
| 712754 | 7/1965 | Canada | 279/4 |

*Primary Examiner*—William R. Briggs
*Attorney, Agent, or Firm*—Donald D. Mon

[57] ABSTRACT

A tool holder for an impact tool. The tool is driven by an actuating rod, and both the actuating rods and the tool have a taper which, when the tool is installed narrow toward each other. They are surrounded by a collet, shaped as a ring and having an opening to receive each of the tapers. Each opening has an internal wall with a matching taper. The taper angles fall within the cone of friction. The collet is expanded by the wedging action of the two sets of tapers. Its springback forces hold the tool to the actuating rod. For removing the tool, the collet has a fluid pressure fitting through which fluid under pressure can be injected into the region between the rod and tool to release one of them from the collet. Preferably the collet is formed so the tool is released before the collet is released from the actuating rod.

6 Claims, 4 Drawing Figures

TOOL HOLDER FOR IMPACT TOOL

This invention relates to a tool holder for holding a tool to the end of an actuating rod in a device which exerts axial forces.

Devices for exerting axial forces, especially impact devices are shown in Ottestad U.S. Pat. Nos. 3,263,575 and 4,111,269 issued Aug. 2, 1966 and Sept. 5, 1978, respectively. These devices have an actuating mechanism which releases a large amount of energy in a short period of time to exert a sharp axial blow which can be used for pavement breaking, mining and analogous uses. Tools for such devices are bits, spades, and the like.

It has been a matter of considerable difficulty and complexity to hold these tools to the end of the actuating rod. It is an object of this invention to provide a simple tool holder, which is reliable and by means of which the tool is quickly attachable and detachable.

A tool holder according to this invention comprises a collet having an axis with a first and second end and an outer wall. There is an opening at each end of the collet. At the first end, the actuating rod is received. At the second end, the tool is received. At each end the opening has an internal tapered wall centered on the axis. The actuating rod and the tool have matching tapers which can be driven into the walls in the respective openings, where they are retained because the tapers are within the cone of friction. Fluid passage means enables fluid under pressure to be injected into the region between the actuator rod and the tool to release the tool from the collet.

According to a preferred but optional feature of the invention, the outer wall of the collet at the second end is reduced to provide a less severe retention of the tool than of the actuating rod.

According to another preferred but optional feature of the invention, the taper angle at the actuating rod is less than the taper of the tool, again to provide a less severe retention of the impact tool than of the actuating rod.

According to yet another preferred but optional feature of the invention, a separator is placed between the end of the actuating rod and the tool so they abut against it, whereby to limit the expansion of the collet.

The above and other features of this invention will be fully understood from the following detailed description and the accompanying drawings, in which.

Figure 1:
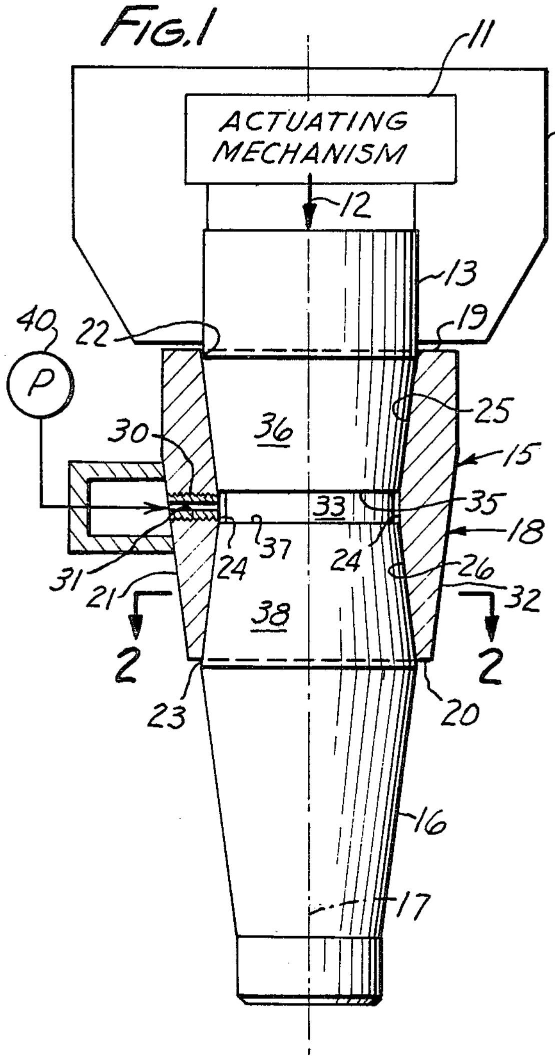
FIG. 1 is an axial cross-section of the presently preferred embodiment of the invention.

In FIG. 1 there is schematically shown the frame 10 and actuating mechanism 11 of an axial force device. Typical devices are shown in the above-identified Ottestad patents. Such a device exerts axial force shown by arrow 12, usually in a percussive mode. The output of the actuating mechanism is generally transmitted by an actuating rod 13. While this rod could be used to deliver the blow, it is customary instead to put perishable tools on the end of it to deliver the blow, because otherwise the forces would soon damage or destroy the rod. That would require excessive maintenance on the device.

Therefore a tool holder 15 is provided to hold tool 16 to the actuating rod. Such a tool might be a bit, a pick, a spade, or a hammer. The tool, rod and tool holder are coaxial along axis 17.

The tool holder comprises a collet 18 having a first end 19, a second end 20, an outer wall 21, a first opening 22 at the first end, and a second opening 23 at the second end.

In the preferred embodiment of the invention, region 24 is provided between the two cavities, and the collet is ring shaped with a passage extending from end to end. The first opening has an internal wall 25 with a taper angle. The second opening has an internal wall 26, also with a taper angle.

A fluid pressure fitting 30 is shown threaded into a threaded port 31 that passes through the wall of the collet and enters region 24.

In the preferred embodiment of the invention, the taper angles of internal walls 25 and 26 are about equal. In order to assure that the tool will be released from the collet preferentially to the collet's being removed from the actuating rod, a portion 32 of the outer wall is tapered so as to reduce the wall thickness near the second end. A less severe retention force is thereby exerted on the tool than on the actuating rod. This is to say, the collet is more resilient near the second end than near the first end.

A solid separator 33 can be placed in region 24 for purposes yet to be described. Alternatively, a web of self material of the collet could be formed where the separator is shown.

End 35 of the actuator rod has an external tapered wall 36 with a taper angle substantially equal to that of internal wall 25. End 37 of the tool has an external tapered wall 38 with a taper angle substantially equal to that of internal wall 36.

The tool is attached to the device by grouping the actuating rod, the collet and tool in that order with the spacer between them. After a few blows, the tapers will have enlarged the collet, and the collet will exert spring back retaining forces. Because the taper angles are within the cone of friction, namely not more than about 13° total included conical angle for finished steel surfaces, the collet will hold fast to both the rod and the tool. The thickness of the separator will prevent overstressing of the ring, because its thickness is selected so that when the tool and the rod both contact it, the proper collet expansion will have occurred. These dimensions can readily be determined by persons skilled in the art. Similarly a web or wall of self-material could be used instead of a disc-like separator, but the collet will then be more complicated to manufacture.

In order to remove the tool, a fluid pressure source 40 which might be a compressor, or even a simple grease-gun device, is threaded into port 31. The exerted fluid pressure, when sufficient, will expand the collet and release the tool. Because of the relative thinness of portion 32, the collet will more readily expand around the tool then around the rod, and the tool will be preferentially released, leaving the collet on the rod. When the fluid pressure source is detached, port 31 will be closed by a plug (not shown).

Figure 3:
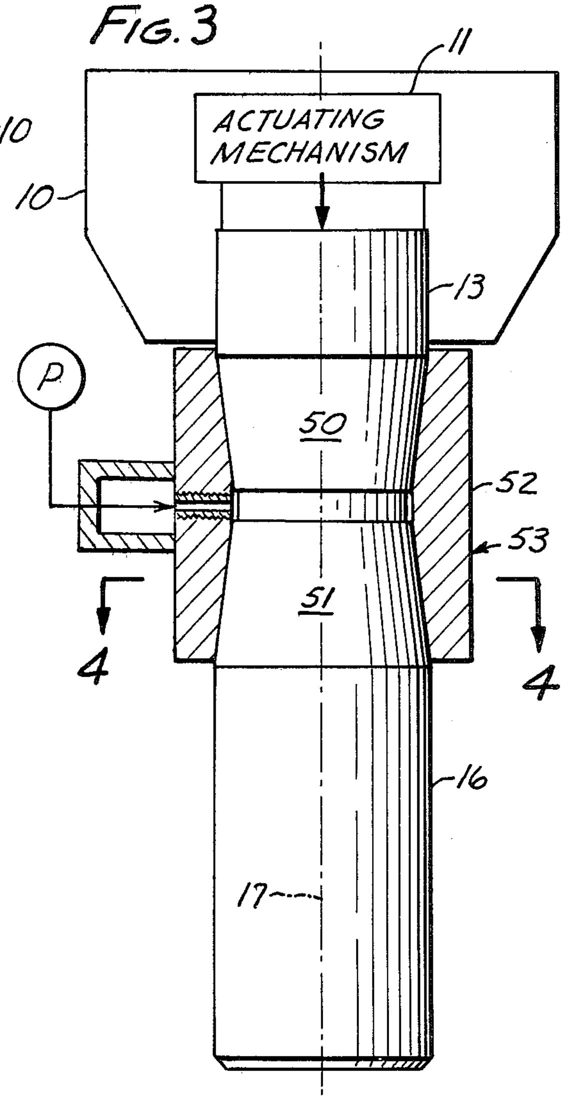
FIG. 3 is an axial cross-section of another embodiment of the invention.
Figure 2:
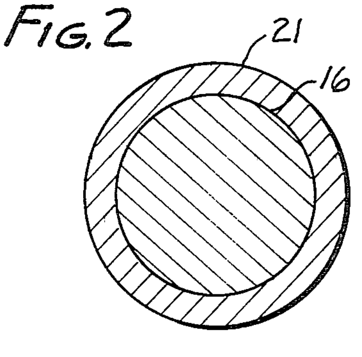
FIG. 2 is a cross-section taken at line 2—2 in FIG. 1.
Figure 4:
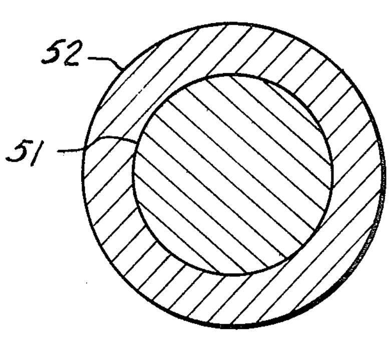
FIG. 4 is a cross-section taken at line 4—4 in FIG. 3.

In FIG. 3 the same elements and articles are shown as in FIG. 1, with the exception that the taper angle of wall 50 is less than that of wall 51, and the outer wall 52 of collet 53 has a uniform diameter. Because the taper angle of wall 50 (which is matched by the taper angle of the actuating rod) is smaller, there will be a more severe retention of the actuating rod, so that the tool will preferentially be expelled from the ring when fluid pressure is applied.

Except for the feature that the taper angles of the tool and of the rod and of the two internal walls are different, the features and functions of the tool holder of FIG. 3 are identical to those of FIG. 1. The included taper angle of wall 50 will preferably be about 1 degree less than that of wall 51.

This device thereby provides a straightforward and simple technique for holding a tool to an actuating mechanism, wherein the tool is easy to attach, is reliably retained, and is easy to remove and replace.

The dimensions of the device may readily be determined by persons skilled in the art. As an example of a suitable device for a nominal 4 inch diameter actuating rod, the collet of FIG. 1 will be about $5\frac{3}{4}$ inches long, about $5\frac{1}{2}$ inches outer diameter, the region 24 about $3\frac{1}{2}$ inches diameter, and the tapers of walls 25 and 26 will be about 16 degrees total included conical angle. The material of the collet may conveniently be made from 4140/42 tubing. The tool and actuating rod are made of suitable steels.

This invention is not to be limited by the embodiments shown in the drawings and described in the description, which are given by way of example and not of limitation, but only in accordance with the scope of the appended claims.

I claim:

1. A compressive coupler to hold a tool to the end of an axially reciprocable, percussive actuating rod, said rod having a peripherally continuous external tapered wall narrowing towards its end where the tool is to be mounted, the tool having a peripherally continuous external tapered wall with a taper angle narrowing toward its end which faces the actuating rod, said tapers having a common central axis which is coincident with the direction of axial forces to be exerted by the actuating rod, said compressive coupler comprising:

a collet having an axis, a first and a second end, an outer wall, a first opening at said first end to receive the said actuating rod, a second opening at said second end to receive said tool, each of said openings being bounded by a respective peripherally continuous internal tapered wall centered on said axis, and having a respective taper angle, which respectively substantially match the taper angles on the actuating rod and tool, said taper angles being within the cone of friction, and fluid inlet means passing through said collet and entering into the region between the ends of said actuating rod and tool when they are pressed into said openings in order to admit fluid under pressure to said region, said tapered walls then making peripheral surface-to-surface fluid sealing contact with one another which renders said region fluid tight, whereby said collet and rod, and said collet and tool, can be joined only by frictional retention, and whereby in order to separate the collet from one of the actuating rod or tool, fluid under pressure can be injected into said region.

2. A compressive coupler according to claim 1 in which a solid separator is disposed within the ring to be abutted by the actuating rod and by the tool to limit the expansion of the collet as caused by the rod and tool.

3. A compressive coupler according to claim 1 in which the taper angles of the two internal walls are equal, and in which the wall thickness of the ring at the second end is reduced.

4. A compressive coupler according to claim 1 in which the taper angle of the internal wall at the first end is smaller than the taper angle at the second end, and in which the outer wall diameter is substantially constant.

5. A tool holder according to claim 3 in which a solid separator is disposed within the ring to be abutted by the actuating rod and by the tool to limit the expansion of the collet as caused by the rod and tool.

6. A tool holder according to claim 4 in which a solid separator is disposed within the ring to be abutted by the actuating rod and by the tool to limit the expansion of the collet as caused by the rod and tool.

* * * * *